D. D. FUNK.
HAND CULTIVATOR AND PLANTER.
APPLICATION FILED OCT. 17, 1908.
946,598.
Patented Jan. 18, 1910.
4 SHEETS—SHEET 3.
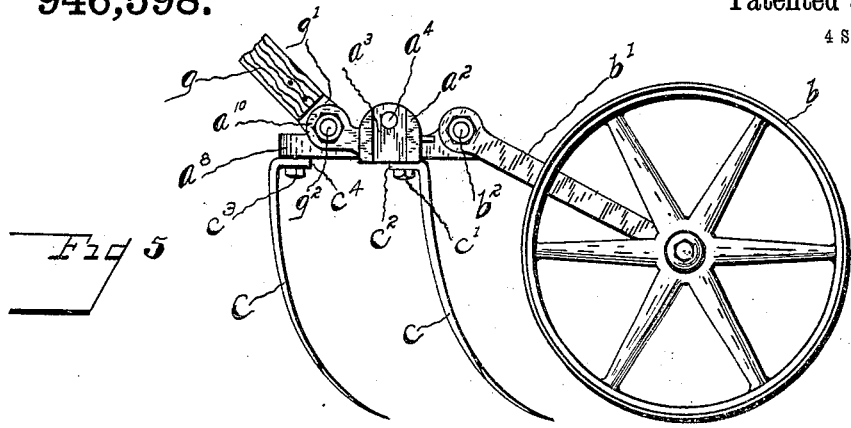
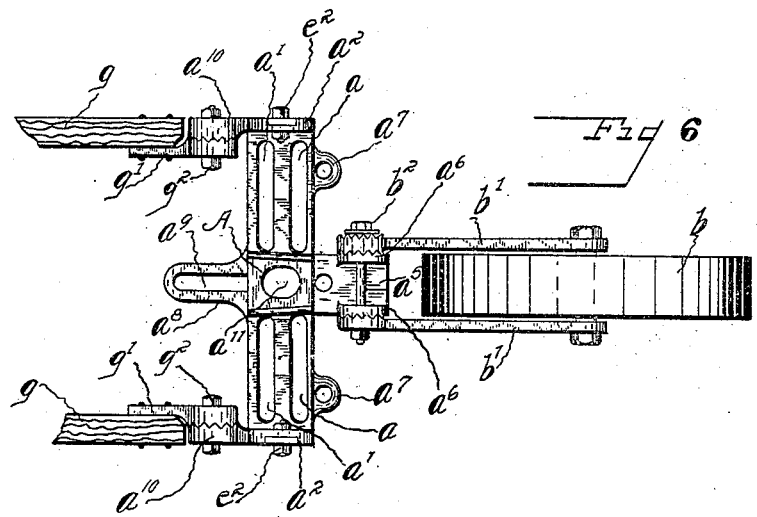

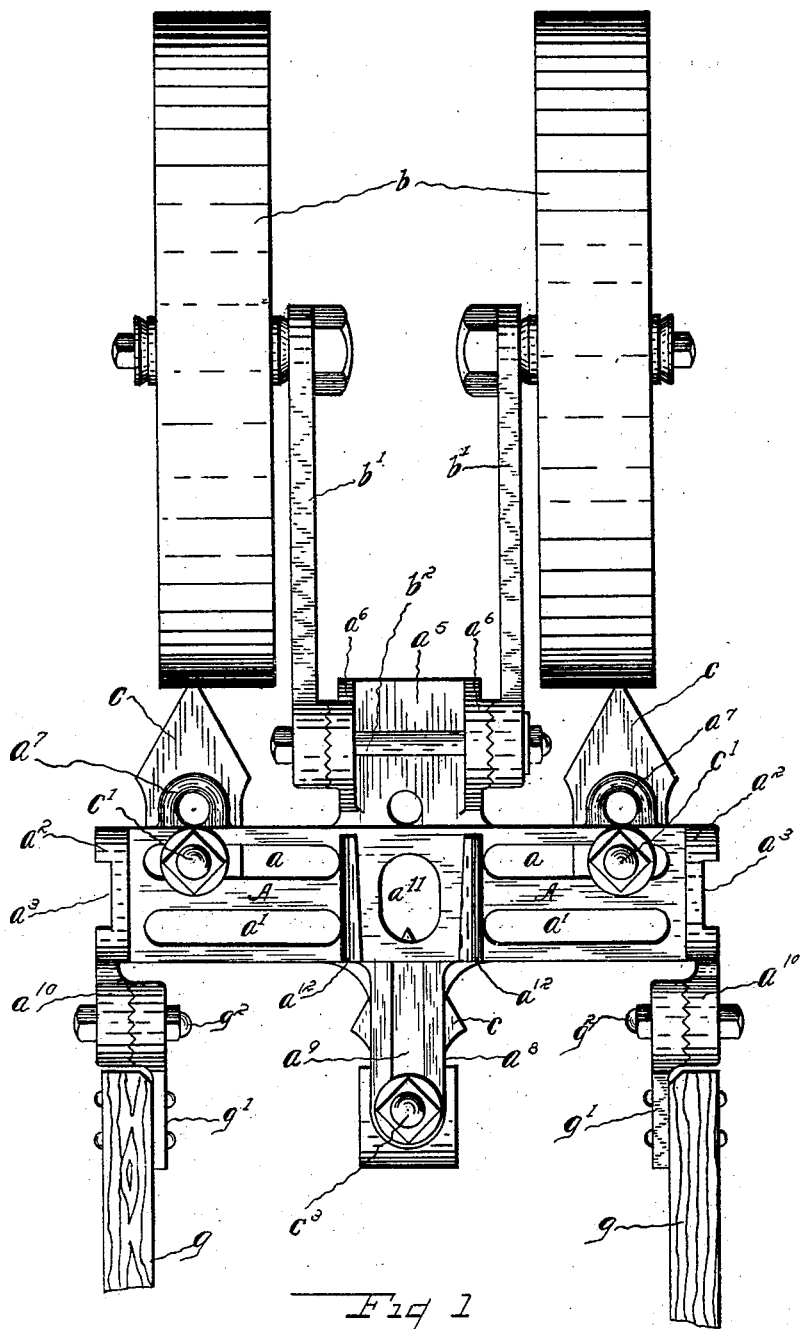

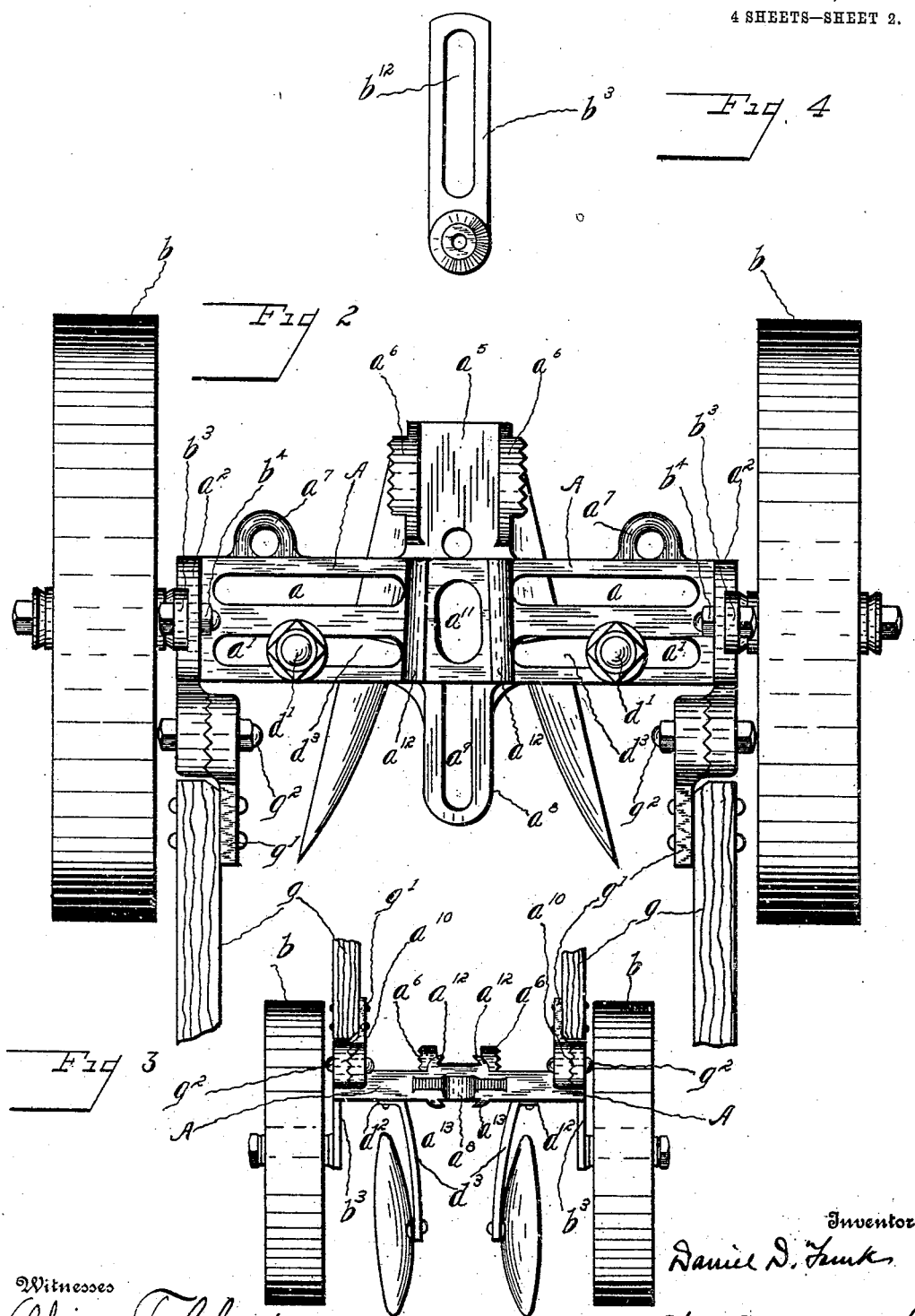

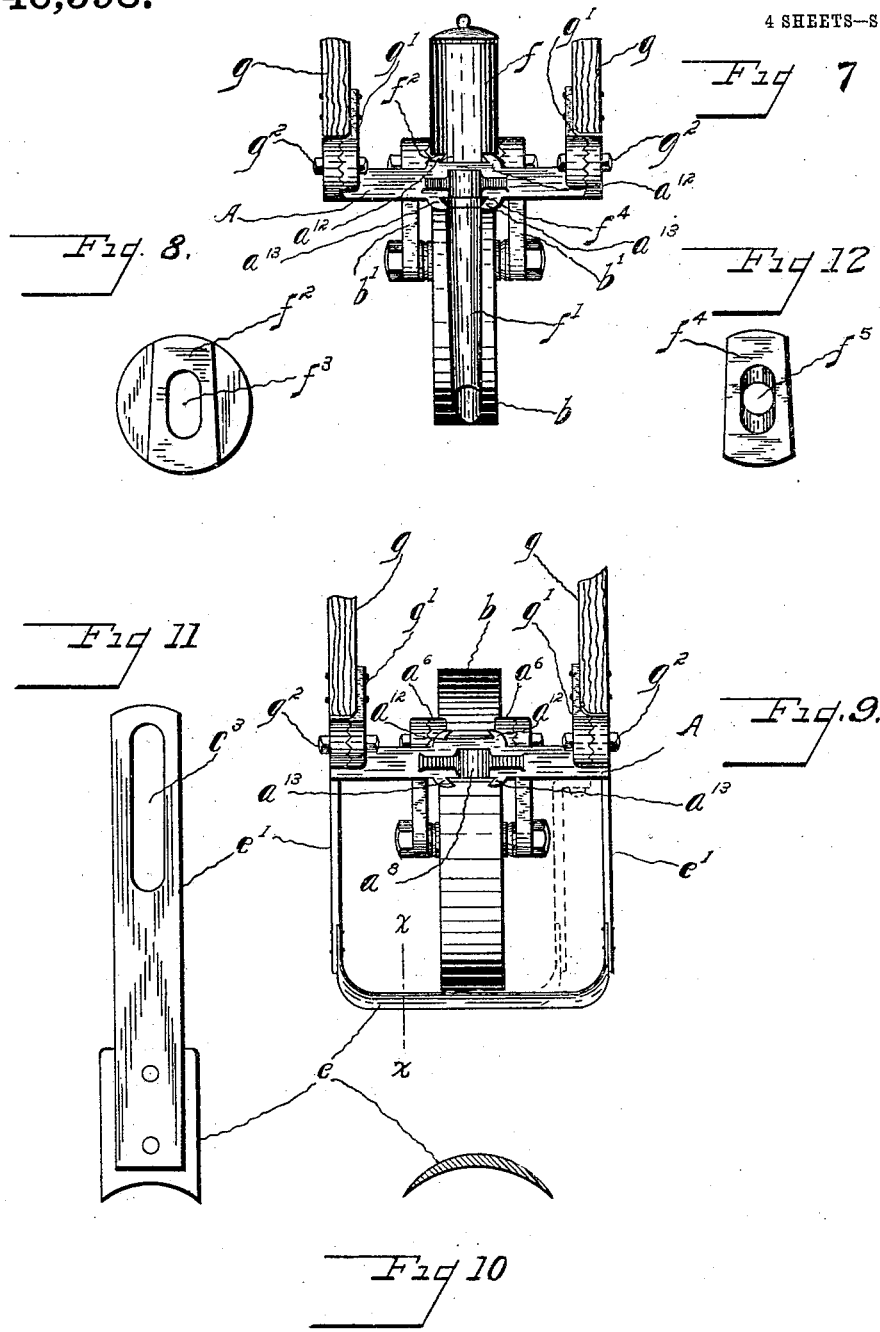

UNITED STATES PATENT OFFICE.

DANIEL D. FUNK, OF SPRINGFIELD, OHIO.

HAND CULTIVATOR AND PLANTER.

946,598.

Specification of Letters Patent.    Patented Jan. 18, 1910.

Application filed October 17, 1908. Serial No. 458,180.

*To all whom it may concern:*

Be it known that I, DANIEL D. FUNK, a citizen of the United States, residing at Springfield, in the county of Clark and State of Ohio, have invented certain new and useful Improvements in Hand Cultivators and Planters, of which the following is a specification.

My invention relates to improvements in cultivating and planting machines, and particularly to machines of this kind which are capable of being manipulated by hand.

An object of the invention is to provide a machine which will be simple in its construction and effective in operation for the different purposes for which it is designed.

A further object of the invention is to provide a device which may be readily and quickly converted from a machine capable of tilling and preparing the soil for seed into a machine for planting the seed, and thence into a machine for cultivating the soil after the plants have started to grow.

A further object of the invention is to provide means for adjusting the operating parts so that they will be either capable of straddling the rows of plants or of cultivating between the rows as desired.

A further object is to provide means for adjusting the parts so that the soil may be hilled toward or thrown away from the growing plants, depending upon the nature of the plants.

A further object of the invention is to provide means of removing the weeds, the particular object being to provide an attachment which will be capable of cutting and uplifting the root of the weed so as to expose and entirely destroy the same.

The invention consists in the constructions and combinations of parts hereinafter described and set forth in the claims.

In the accompanying drawings, Figure 1 is a top plan view representing the parts assembled to form an implement capable of preparing the soil for the seed. Fig. 2 is also a top plan view and shows the parts assembled for the purpose of providing an implement capable of straddling the row of plants for cultivating purposes. Fig. 3 is a rear view of some of the parts shown in Fig. 2. Fig. 4 is a detail of side supporting arm for carrying wheel. Fig. 5 is a side elevation of the implement as shown in Fig. 1. Fig. 6 is a top plan showing the implement in position for use as a scraper or remover of weeds. Fig. 7 is a rear elevation of the implement when used as a planter, showing more particularly the means for attaching the seed hopper and furrow opener. Fig. 8 is a bottom plan view of the hopper. Fig. 9 is also a rear elevation showing the machine equipped with the weed scraper or remover. Fig. 10 is a section through the scraper on the line $x\ x$ of Fig. 9. Fig. 11 is another detail of the scraper. Fig. 12 is a plan view of the boot.

Like parts are represented by similar characters of reference in the several views.

In the said drawings, A represents the main frame or head of the machine, and it is to this head that all of the various operating parts are attached in their different positions of use. To permit of the different changes in position and adjustment of the operating parts, the head is formed of peculiar construction. Extending transversely across the head, on each side of the center thereof, are front and rear slots, $a\ a$ and $a^1\ a^1$. Each side of the head is preferably extended upwardly, as indicated at $a^2$, and each side and its upward extension is provided with a recess, $a^3$, and also with a perforation, $a^4$, located in the extended portion. (Fig. 5.) Extending forward from the head, in the center of the width thereof, is a projection, $a^5$, having on each side thereof upwardly-projecting perforated ears, $a^6, a^6$, the outer faces of which are provided with serrations, as shown. Also extended forwardly on either side of the central projection, $a^5$, are two smaller perforated projections, $a^7\ a^7$. Projecting rearwardly from the center of the width of the head is a projection, $a^8$, having a longitudinal slot, $a^9$. Also projecting rearwardly are side projections, $a^{10}\ a^{10}$, perforated and provided with serrations on their inner faces, as shown. Extending vertically through the center of the head is an opening, $a^{11}$, and on the upper side of the head, on opposite sides of the opening, $a^{11}$, are upwardly projecting ribs, $a^{12}$, converged toward each other, as shown in Figs. 1 and 2, and also under-cut, as indicated in Figs. 8 and 10, so as to form a converging dovetailed groove-way, with the opening, $a^{11}$, located in the center thereof. The under side of the head is similarly formed with a converging dovetailed groove, by having similarly shaped converging, under-cut ribs, $a^{13}\ a^{13}$, (Figs. 8 and 10). The head or frame as thus described is formed in one integral piece.

$b$ $b$ are carrying or gage wheels, and are adapted to be connected to the head in several different positions, depending upon the conditions of use, through the medium of one instance, of forwardly extending arms, $b^1$ $b^1$, secured to the perforated ears $a^6$ $a^6$ through the medium of the bolt, $b^2$; the rear ends of said arms having serrated faces on either side corresponding to the serrated faces of the ears so that the arms may be held in different positions of adjustment. In another instance of use, the wheels are secured at the sides of the head or frame by short downwardly-extending arms, $b^3$, secured in the recesses, $a^3$, of the head, through the medium of bolts, $b^4$. In another instance of use, both of the forwardly extending arms, $b^1$, may be used to connect a single wheel, as shown in Fig. 6, for instance. The wheels $b$ $b$ are journaled to the ends of the arms $b^1$ or $b^3$ in any suitable manner.

In Figs. 1 and 5 the device is shown equipped with shovels, $c$ $c$ $c$, three being employed in one instance of use and two in another instance as more fully explained hereinafter. The two front shovels are secured to the front slots, $a$ $a$, of the head through the medium of bolts, $c^1$ $c^1$, which pass through the slots and also through the upper rearwardly bent ends, $c^2$ of the shovels. The rear shovel is connected to the rear projection, $a^1$, through the medium of the slot, $a^9$, bolt, $c^3$, and the upper forwardly turned end, $c^4$, of the shovel. In preparing the soil for the seed, all three shovels are employed and by having the two front shovels secured well toward the outer ends of the front slots, $a$ $a$, and the rear shovel well toward the rear end of the slot $a^9$ of the projection $a^8$, sufficient room is secured between the shovels to allow for the clearance of the earth and trash between the shovels. By removing the rear shovel the device can be used for cultivating purposes either by straddling the row of plants or by running the implement between two rows of plants. By turning and securing the shovels so that their points will be at an angle to the line of travel, either toward or from the plants, the earth may be hilled toward or thrown away from the plants; it being very desirable with some sort of plants to hill toward them, while with others it is necessary for their proper growth to throw the earth away from the plants. Besides the adjustment for the different angular positions of the shovels, by means of the transverse slots in which they are secured, the shovels may also be adjusted to different distances apart to accommodate them to the nature of the plants and the width of the rows.

In Figs. 2 and 3 is illustrated the implement equipped with disks $d$, instead of the shovels. These disks are used for cultivating the plants and for straddling the rows only. They are secured in the rear slots, $a^1$, of the head, by bolts, $d^1$, projecting through the slots and also through the bent end, $d^2$, of arms, $d^3$, to the lower ends of which arms the disks are journaled. It will be seen that these disks may be set at any angle and by reversing the disks they may be employed to either hill toward or throw the earth away from the plants as in the case with the shovels. In the position in which they are shown in Fig. 2, they will throw the earth away from the plants. The disks are connected to the rear slots of the head for the purpose of placing them as far back of the wheels as possible when the wheels are in position at the side of the head, the advantage of placing the wheels at the side of the head when used with the disks being that when operating on a side hill the machine is more easily handled. The arms, $b^3$, connecting the wheels to the sides of the head, are provided with a slotted opening, $b^{12}$, to receive the bolts, $b^4$, so that the wheels may be adjustably secured to the head to provide for different depths of penetration of the disks. The use of the disks is of great advantage in all cases where the plant matures and grows on the surface of the ground, such as onions, turnips, beets, radishes, etc.

Adapted to be attached in the recesses, $a^3$, of the head is a scraper or up-rooter for weeds, indicated by $e$; (Figs. 6, 9, 10 and 11) the upper ends of the side arms, $e^1$, of the scraper being connected to the head through the medium of bolts, $e^2$, which pass through the perforations, $a^4$, and through slotted openings, $e^3$, in the side arms so as to adjustably secure the scraper in position. But one carrying wheel will be used with the scraper, it being connected to the forwardly extending arms, $b^1$, as shown in Fig. 6; this permitting the machine to be tilted to enable the operator to manipulate the scraper close to the plants. The scraper proper, $e$, is formed on the arc of a circle in cross-section so as to provide a convex upper surface and also a double cutting edge. In operation the scraper is run below the surface of the ground so as to cut the roots of the weed in two below the surface and then up-lift the upper part of the root and expose it to the air, thus completely destroying the weed. By having the double cutting edge the scraper can be run backwardly as well as forwardly, and the peculiar shape of the scraper renders the edges more or less self-sharpening in operation, and assists in up-lifting the roots. The scraper is adjustably secured to the head for the reason that in some cases it is desirable to run one end of the scraper deeper than the other.

When it is desired to use the device as a planter, a seed hopper, $f$, and furrow opening shoe, $f^1$, are attached to the head. (Fig. 8.) The seed hopper is equipped with any suitable feeding devices for the seed, the feed shaft of which will be driven from the carrying wheel, one only of which will be used in this case carried between the two forwardly-projecting arms, $b^1$. The novel feature of the planting device is the manner of attaching the hopper and furrow opener to the head. As before described, the head is provided on its upper and lower sides with converging, dove-tailed groove-ways converged forwardly or toward the line of strain. The bottom of the hopper is provided with a central converging, dove-tailed, rib, $f^2$, adapted to snugly fit within the upper groove-way and thus secure the hopper to the head. The rib, of course, is perforated as shown at $f^3$ to permit the passage of the seed to the boot of the furrow opener through the opening, $a^{11}$. The top of the boot, $f^1$, is provided with a head, $f^4$, converged and undercut to conform to the shape of the under groove-way of the head and is adapted to be slipped into said groove to secure the boot and furrow opener to the head, this casting having an opening, $f^5$, therein for the passage of the seed. This bottom groove-way is converged rearwardly or toward the line of strain on the furrow opener.

$g$ $g$ are the operator's handles, provided with perforated projections, $g^1$, at their forward ends connected to the rear projections $a^{10}$ $a^{10}$, of the head, the projections, $g^1$, having serrated faces corresponding to the serrated faces of the projections $a^{10}$ so that the handles may be held in different position of adjustment to suit the taste of the operator; bolts, $g^2$, extending through the perforations of the respective parts, being adapted to secure them together.

The perforated forwardly extending projections, $a^7$, are for the purpose of forming an attachment for a drag-chain or other device to assist the operator where the ground is very hard, but ordinarily a single operator at the handles, $g$, can manipulate the implement.

It will be seen that an implement is thus provided having a wide range of uses and which is very simple in its construction. The purchaser may, if he desire, simply secure the main head, three shovels and one carrying or gage wheel and have a complete machine in itself for the purpose of preparing the soil and cultivating the plants. At any time thereafter he can make the additional purchase of the disks, additional carrying-wheels, and of the planting devices. By the construction of the head or frame, as described, the implement may be readily changed from one form of machine into another.

By reason of the laterally turned upper ends of the cultivating shovels as described, the shovels can be attached to either the bottom or top of the main head or support, in case it is desired to cultivate shallow close to the plants with one shovel and deep between the rows of plants with the opposite shovel.

Having thus described my invention, I claim:—

1. In a machine of the character described, a main head, a front and rear transverse slot on each side of said head, a central rearwardly projecting portion forming an integral part of said head and having a longitudinal slot, and a front extension having serrated faces on each side thereof, substantially as and for the purpose specified.

2. In a machine of the character described, a main head, said head having front and rear transverse slots on each side thereof, a central rearwardly projecting portion forming an integral part of said head and having a longitudinal slot, and a serrated projection integral with said head and located on each side of said central projecting portion, substantially as and for the purpose specified.

3. In a machine of the character described, a main head, said head having transverse slots, a rearward extension having a longitudinal slot, a front extension having serrated faces on the sides thereof, and a recess on each side of said head together with perforated extensions forming continuations of said recesses, substantially as specified.

4. In a machine of the character described, a main head, said head having transverse slots, a rearward extension having a longitudinal slot, a front extension having serrated faces on the opposite sides thereof, a recess on each side of said head with perforated extensions forming continuations of said recesses, and central longitudinally extending converged dove-tailed grooves on the top and bottom of said head, substantially as specified.

5. In a machine of the character described, a main head, slots arranged in said head, and central longitudinally-extending converged dove-tailed grooves on the top and bottom of said head, substantially as and for the purpose specified.

In testimony whereof, I have hereunto set my hand this 6th day of October, 1908.

DANIEL D. FUNK.

Witnesses:
CHAS. I. WELCH,
OLIVER T. CLARKE.